J. CARR.
TOOL HOLDER.
APPLICATION FILED FEB. 17, 1910.
1,033,875.
Patented July 30, 1912.
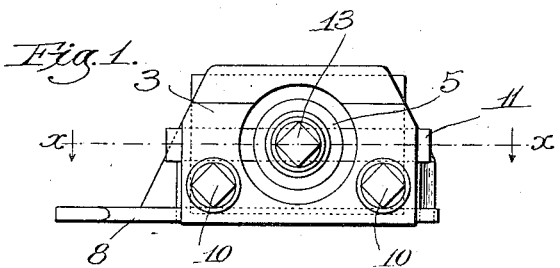
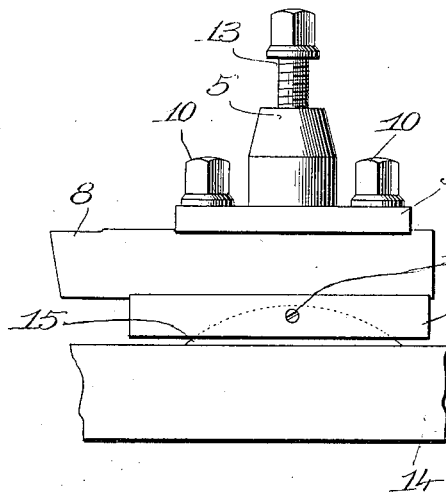
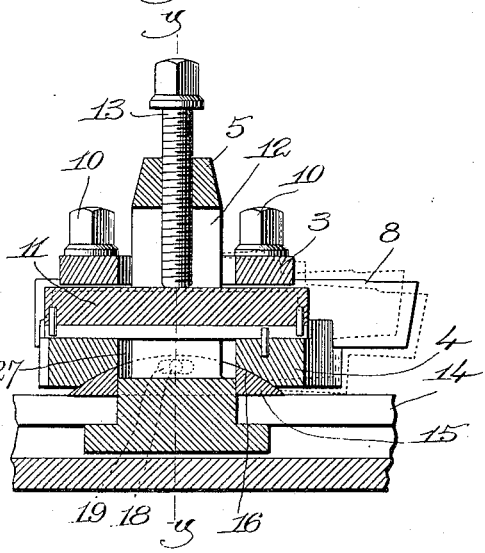
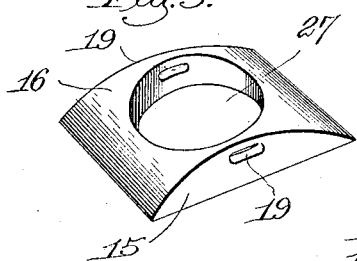
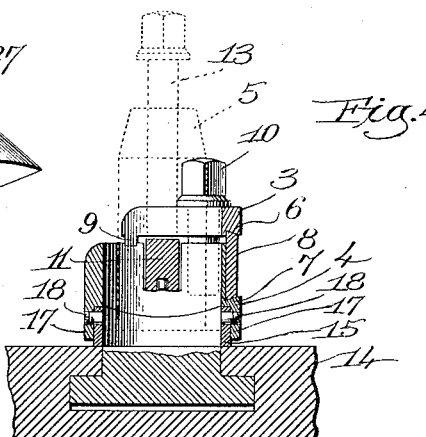
Witnesses
Thomas J. Drummond
Joseph M. Ward.
Inventor.
James Carr,
by Mosby Gregory,
Attys.

UNITED STATES PATENT OFFICE.

JAMES CARR, OF SYRACUSE, NEW YORK, ASSIGNOR TO THE HENRY G. THOMPSON & SON COMPANY, OF NEW HAVEN, CONNECTICUT, A CORPORATION OF CONNECTICUT.

TOOL-HOLDER.

1,033,875.  Specification of Letters Patent.  Patented July 30, 1912.

Application filed February 17, 1910. Serial No. 544,452.

*To all whom it may concern:*

Be it known that I, JAMES CARR, a citizen of the United States, residing at Syracuse, county of Onondaga, State of New York, have invented an Improvement in Tool-Holders, of which the following description, in connection with the accompanying drawing, is a specification, like characters on the drawing representing like parts.
This invention relates to tool holders for use in a lathe and has for its object to provide a novel tool holder which is provided with an adjustment for raising or lowering the cutting edge of the tool according to the character of the work being performed.

When a cutting-off tool is being used, it is desirable that the cutting edge of the tool should be on the horizontal center of the work; when a turning tool is being used, it is customary to adjust it so that the cutting edge will be a trifle above the horizontal center; and when a threading tool is being used, it is customary to adjust the cutting edge slightly below the center. The carriage of some lathes is provided with means for securing this vertical adjustment, but there are many lathes in which the carriage is stationary. My invention is particularly applicable to this latter style of lathe because by means of it the tool holder can be readily adjusted so as to bring the cutting edge of the tool into its proper vertical position for any kind of work.

My invention can be used in connection with tool holders of various kinds and to illustrate the principle of it, I have shown it herein as embodied in a tool holder of the general type shown in Patent No. 939,976, dated November 16, 1909, and granted to James Carr and William Carr. I would state, however, that the invention is not limited to use in connection with this particular type of tool holder.

Referring to the drawings, Figure 1 is a plan view of a tool holder such as illustrated in the above-mentioned patent having my improvements applied thereto; Fig. 2 is a side view of the tool holder and part of the carriage; Fig. 3 is a section on substantially the line x—x, Fig. 1; Fig. 4 is a section on the line y—y, Fig. 3; Fig. 5 is a perspective view of the rest.

The tool holder herein shown and which is claimed in said above-mentioned Patent No. 939,976 comprises an upper and lower tool-clamping member designated 3 and 4 respectively, which are adapted to encircle and surround the tool post 5 and which are arranged with the seats 6 and 7, respectively, between which the tool 8 is adapted to be clamped. The upper tool-clamping member 3 is provided with a rib 9 which sits in a groove in the top edge of the lower clamping member 4 and the two members are clamped together to firmly hold the tool by clamping screws 10 which are separate and independent from the tool post. The lower clamping member is provided with a longitudinal slot in which is slidably mounted a key 11, and this key is adapted to extend through the usual slot 12 in the tool post and to be acted on by the usual set screw 13 carried by the tool post, as shown in Fig. 3. The tool holder is supported by the carriage 14 in which the tool post is mounted, and by tightening up the set screw 13, the tool holder will be firmly clamped in position by the key 11, all as is more fully described in said patent.

The parts thus far described are such as are shown in said patent and form no part of the present invention, which relates to an arrangement for effecting vertical adjustment of the cutting edge of the tool without raising or lowering the carriage 14. This end is accomplished herein by interposing between the tool holder and the carriage a rest or support 15 having a rounded upper face 16 which fits into a concavity formed in the bottom of the lower clamping member 4. As herein shown, the rest is provided with a central aperture 27 through which the tool post 5 passes, and said rest is of slightly less width than the lower clamping member 4 so that the sides of the lower clamping member overlie the sides of the rest, as shown at 17 in Fig. 4. These portions 17 of the clamping member are each provided with an inwardly-extending pin or projection 18 which enters a slot 19 formed in the side walls of the rest or support. The convexity of the face 16 extends in the direction of the length of the tool 8. Whenever it is desired to elevate or depress the cutting edge of the tool the set screw 13 is loosened and the position of the tool holder is shifted on the rest or support 15, as shown in dotted lines in Fig. 3. By means of this construction the cutting edge of the tool can be adjusted vertically a limited distance which is sufficient for all ordinary purposes. When the set screw 13 is tightened, the tool holder will be firmly clamped in position, as will be obvious. In order to permit this rocking movement of the tool holder, it is, of course, necessary that the aperture therethrough should be slightly larger than the tool post.

While my invention has been described as it would be used in connection with a tool holder of one particular construction, yet it will be obvious that the invention might be equally well used with tool holders of other types.

Having fully described my invention, what I claim as new and desire to secure by Letters Patent is:—

1. In a tool-holding device, the combination with a carriage and a tool post, of a tool-holding member having an aperture through which the tool post extends and provided on its lower side with a recess having a curved face, a rest situated within said recess and having a convex face to fit the curved face of the recess, said rest having an aperture through which the tool post extends, and means connecting said rest to said tool-holding member, which means holds the rest in said recess while permitting it to have a sliding movement longitudinally of the recess.

2. In a tool-holding device, the combination with a carriage and a tool post, of a tool-holding member having an aperture through which the tool post extends and provided on its lower side with a recess having a curved face, a rest situated within the recess and having a convex face to fit the curved face of the recess, said rest having an aperture through which the tool post extends and provided with slots in its sides, pins carried by the tool-holding member and entering said slots for securing the rest to the member while permitting rocking movement of the member on the rest, and means to clamp the tool-holding member to the carriage.

In testimony whereof, I have signed my name to this specification, in the presence of two subscribing witnesses.

JAMES CARR.

Witnesses:
   G. B. LEAVENWORTH,
   T. F. MAHER, Jr.

---

Copies of this patent may be obtained for five cents each, by addressing the "Commissioner of Patents, Washington, D. C."